(12) United States Patent
Brown et al.

(10) Patent No.: US 8,023,742 B2
(45) Date of Patent: Sep. 20, 2011

(54) LOCAL IMAGE DESCRIPTORS USING LINEAR DISCRIMINANT EMBEDDING

(75) Inventors: Matthew Alun Brown, Seattle, WA (US); Gang Hua, Kirkland, WA (US); Simon A. J. Winder, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 11/868,988

(22) Filed: Oct. 9, 2007

(65) Prior Publication Data

US 2009/0091802 A1    Apr. 9, 2009

(51) Int. Cl.
*G06K 9/46* (2006.01)
*G06K 9/68* (2006.01)

(52) U.S. Cl. ......................... 382/195; 382/219

(58) Field of Classification Search .................. 382/209, 382/217, 218, 219, 118, 224, 276, 190, 195
See application file for complete search history.

(56) References Cited

U.S. PATENT DOCUMENTS

| | | | |
|---|---|---|---|
| 7,010,167 B1 * | 3/2006 | Ordowski et al. | 382/225 |
| 7,203,346 B2 | 4/2007 | Kim et al. | |
| 2004/0015495 A1 | 1/2004 | Kim et al. | |
| 2004/0208372 A1 | 10/2004 | Boncyk et al. | |
| 2005/0286767 A1 | 12/2005 | Hager et al. | |
| 2006/0034517 A1 | 2/2006 | Bober et al. | |
| 2006/0253491 A1 | 11/2006 | Gokturk et al. | |
| 2007/0112699 A1 | 5/2007 | Zhao et al. | |
| 2007/0116373 A1 | 5/2007 | Hwang et al. | |

FOREIGN PATENT DOCUMENTS

| | | |
|---|---|---|
| JP | 16-005622 A | 1/2004 |
| JP | 16-038987 A | 2/2004 |
| KR | 10-2005-0060628 A | 6/2005 |
| KR | 10-2005-0112219 A | 11/2005 |
| KR | 10-2007-0061289 A | 6/2007 |

OTHER PUBLICATIONS

Ling et al. "Sirface vs. Fisherface: Recognition Using Class Specific Linear Projection." Proceedings of the 2003 International Conference on Image Processing, vol. 3, Sep. 14, 2003, pp. III-885 to III-888.*

Li et al. "Linear Projection Methods in Face Recognition under Unconstrained Illuminations: A Comparative Study." Proceedings of the 2004 IEEE Computer Society Conference on Computer Vision and Pattern Recognition, vol. 2, Jun. 27, 2004, 8 pages.*

(Continued)

*Primary Examiner* — Jon Chang

(57) ABSTRACT

To render the comparison of image patches more efficient, the data of an image patch can be projected into a smaller-dimensioned subspace, resulting in a descriptor of the image patch. The projection into the descriptor subspace is known as a linear discriminant embedding, and can be performed with reference to a linear discriminant embedding matrix. The linear discriminant embedding matrix can be constructed from projection vectors that maximize those elements that are shared by matching image patches or that are used to distinguish non-matching image patches, while also minimizing those elements that are common to non-matching image patches or that distinguish matching image patches. The determination of such projection vectors can be limited such that only orthogonal vectors comprise the linear discriminant embedding matrix. The determination of the linear discriminant embedding matrix can likewise be constrained to avoid overfitting to training data.

20 Claims, 3 Drawing Sheets

OTHER PUBLICATIONS

Yang. "Kernel Eigenfaces vs. Kernel Fisherfaces: Face Recognition Using Kernel Methods." Proceedings of the Fifth IEEE International Conference on Automatic Face and Gesture Recognition, May 21, 2002, 7 pages.*

Kim at al., "Locally Linear Discriminant Analysis for Multimodally Distributed Classes for Face Recognition with a Single Model Image", 2005, vol. 27, No. 3, IEEE Transactions on Pattern Analysis and Machine Intelligence, pp. 1.

Kim et al., "Component-based LDA Face Descriptor for Image Retrieval", Human Computer Interaction Lab, Samsung AIT, pp. 507-516.

Bouveyron et al., "Dimension Reduction and Classification Methods for Object Recognition in Vision", pp. 1-4.

Yu et al., "Learning image manifolds by semantic subspace projection", 2006, ACM, pp. 297-306.

Viola et al., "Rapid object detection using a boosted cascade of simple features", Dec. 2, 2001, Accepted Conference on Computer Vision and Pattern Recognition, pp. 1-9.

Snavely et al., "Photo tourism: Exploring photo collections in 3D", 2006, vol. 25, ACM, pp. 835-846.

Sivic et al., "Video google: A text retrieval approach to object matching in videos", Oct. 2, 2003, IEEE International Conference. on Computer Vision, vol. 2, pp. 8.

Schmid et al., "Local grayvalue invariants for image retrieval", May 6, 1997, IEEE Transactions on Pattern Analysis and Machine Intelligence, pp. 6.

Nister et al., "Scalable recognition with a vocabulary tree", Jun. 2, 2006, Centre for Visualization and Virtual Environments, Department of Computer.

Lowe, "Distinctive image features from scale invariant keypoints", Jan. 5, 2004, International Journal of Computer Vision, pp. 1-28.

Lepeti et al., "Randomized trees for real-time keypoint recognition", Computer Vision Laboratory, pp. 7.

Ke et al., "PCA-SIFT: A more distinctive representation for local image descriptors.", 2003, Intel Corporation, pp. 10.

He et al., "Face recognition using laplacianfaces", Mar. 2, 2005, pp. 1-34.

Fergus et al., "Learning object categories from Google's image search", Oct. 2, 2005, pp. 8.

Duchene et al., "An optimal transformation for discriminant and principal component analysis", Nov. 4, 1988, vol. 10, No. 6, IEEE Transaction on Pattern Analysis and Machine Intelligence, pp. 978-983.

Chen et al., "Local discriminant embedding and its variants", 2005, IEEE Conf. on Computer Vision and Patter Recognition, pp. 846-853.

Berg et al., "Geometric blur for template matching", 2001, IEEE Conf. on Computer Vision and Pattern Recognition, pp. 607-614.

Belongie et al., "Shape context: A new descriptor for shape matching and object recognition", 2000, MIT Press, p. 7.

Belhumeur et al., "Eigenfaces vs. Fisherfaces: Recognition using class specific linear projection", 1997, IEEE, pp. 711-720.

Mikolajczyk et al., "A performance evaluation of local descriptors", 2005, IEEE Transactions on Pattern Analysis and Machine Intelligence, pp. 7.

* cited by examiner

LOCAL IMAGE DESCRIPTORS USING LINEAR DISCRIMINANT EMBEDDING

BACKGROUND

Image recognition is a human capability that is not easily translated into the computing space. A human, for example, can recognize the face of a friend from among a collection of facial photographs. Similarly, a human can recognize photographs of the same object, even when taken from different angles or at different times of day. By contrast, computing devices generally undertake detailed analysis of individual elements of an image in order to perform functions approximating a human's facial recognition or image matching abilities.

Traditionally, image matching, including facial recognition, is performed by a computing device by identifying interest points within an image and then analyzing the identified interest points based on the image information surrounding such points. A "patch" of the image around the interest point can be analyzed through various means, including the use of filters, transformations and hashes. For example, a 64-by-64 pixel square around an interest point could be used, yielding a total of 4,096 values, with each value representing the information contained in one pixel. Subsequently, the 4,096 values could be reduced to a collection of 64 or 128 values through various filters and transformations. The filters and transformations used were traditionally selected based on manually tuned parameters such that the resulting 64 or 128 values emphasized those elements of the original patch that distinguished it from different patches and those elements that it shared with matching patches. In addition, the filters and transformations were also selected so that they deemphasized those elements that made the patch appear similar to non-matching patches or that distinguished the patch from matching patches.

Once the patches had been reduced to a smaller number of values, comparisons could be made among these patch values, with patches having similar values being found to be matching, while patches with dissimilar values being found to be non-matching. The overall image could then be matched to other images based on the quantity and location of matching patches.

SUMMARY

When an image patch is converted into a smaller set of data, the new data is commonly referred to as a "descriptor" of the image patch. Descriptors having too many discrete data values, known as the "dimensions" of the descriptor, can require a greater amount of computing resources to process. In addition, if the filters and transformations applied are selected based on manually tuned parameters, there is no indicia that the filters and transformations are optimal for enabling image matching. Consequently, in one embodiment, a linear discriminant embedding is used to derive a descriptor of image patches. The linear discriminant embedding is derived from training patches that are used to identify vectors along whose direction the ratio of the variance between the difference between non-matching patches and the difference between matching patches is maximized.

As part of the training process, patches can first be categorized as matching or non-matching. Subsequently, one or more transformations can be applied to the vectors representing the training patches to provide greater discrimination between non-matching patches, and to provide for greater similarity between matching patches. The differences between the transformed patches can be found along a direction identified by a vector and the vector can be selected based on the direction that exhibits a maximized ratio of the variance between the difference between non-matching patches and the difference between matching patches. A series of such vectors can form a matrix that can act as a linear projection of transformed patch data into a subspace of fewer dimensions than the transformed patch data.

Once a linear projection is identified, given the optimizing criteria, it can be used to perform linear discriminant embedding. Initially, a patch is first transformed using one or more transformations that can emphasize similarities between matching patches and differences between non-matching patches. Subsequently, linear discriminant embedding can be applied to the transformed patch, using the linear projection identified, to project the transformed patch data into a subspace comprising fewer dimensions. Once projected, the resulting data can be normalized and output as the descriptor of the image patch. Image patches can then be matched based on their descriptors in accordance with known image matching algorithms.

To provide greater accuracy, in one embodiment, overfitting of the linear discriminant formulation to the training patches can be minimized by performing a power regularization. The sum of the differences between matching patches along a direction can be expressed in a form using covariance matrices. The matrix values can be limited such that the eigenvalues of the matrix are clipped against minimum values established based on a fraction of the signal power associated with the particular eigenvalues. In another embodiment, the direction along which the transformed training patches' differences are evaluated can be limited to a direction orthogonal to the other directions that comprise the linear discriminant projection being derived. Such orthogonality can also avoid overfitting and can avoid redundancy in the subspace into which the transformed patch will be projected by the linear discriminant.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
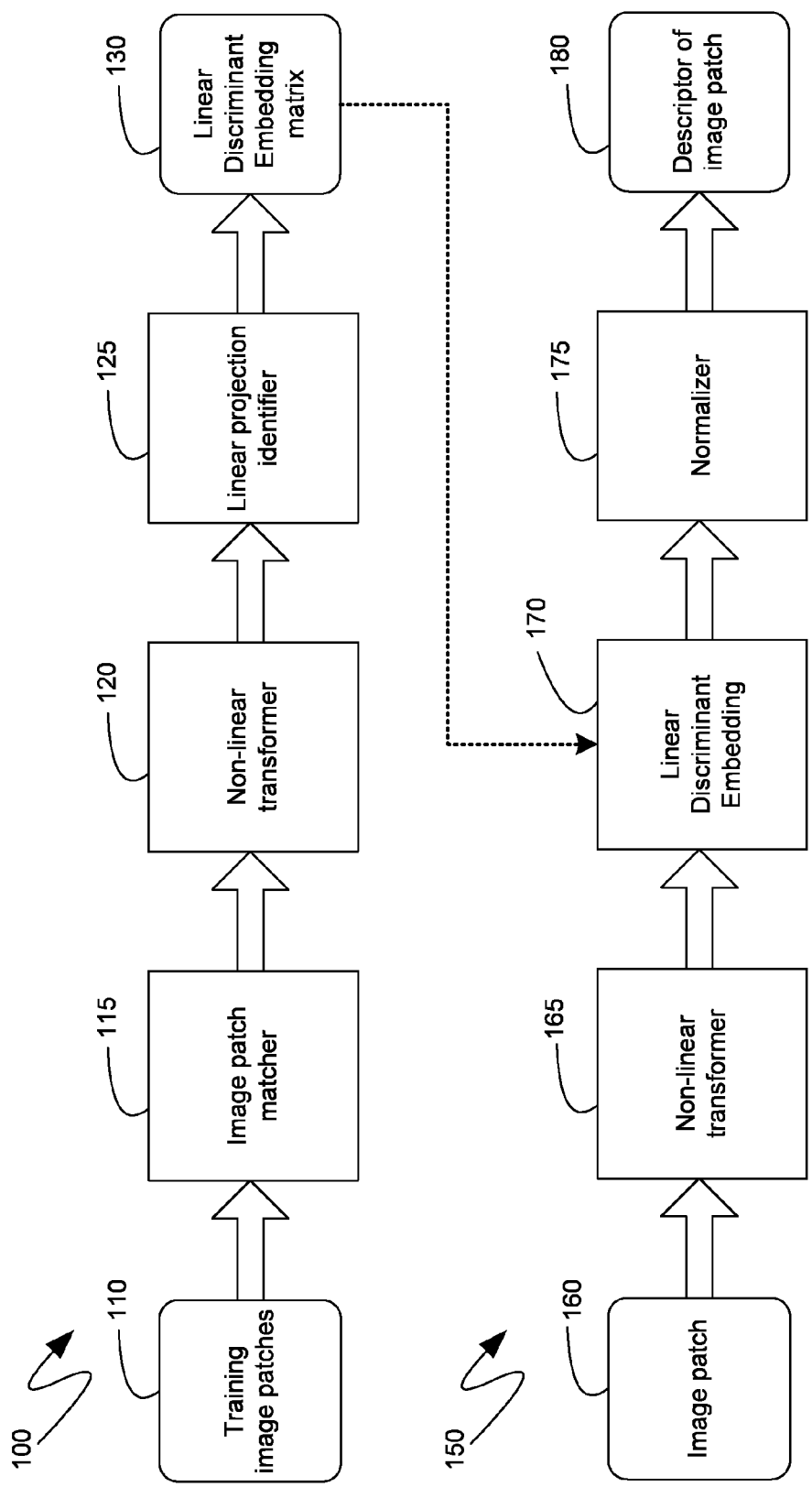
FIG. 1 is a diagram of an exemplary system for identifying and using a linear discriminant projection.

The following description relates to the derivation of a descriptor of an image patch using linear discriminant embedding. An image patch can be compared to other image patches to determine whether the image patches are matching or non-matching. Images can then be analyzed, such as for facial recognition or image matching, based on the quantity and location of matching, and non-matching, image patches. Because even a small section of an image, such as a 64-by-64 pixel section, can comprise over four thousand discrete values, image patches are generally distilled into smaller collections of values to enable more efficient matching. Such smaller collections of values are known as the "descriptor" of the image patch.

The techniques described herein focus on both the generation of a linear discriminant embedding matrix and the use of such a matrix to derive a descriptor of an image patch. The linear discriminant matrix can be generated in a structured manner designed to obtain an optimal solution. A series of training patches, identified as matching or non-matching, can be used to generate the matrix. Vectors representing the training patches can be transformed to emphasize features contained within the training patches that can be useful in performing matching, and the linear discriminant embedding matrix can be obtained by identifying projections of the transformed training patches that maximize the ratio of the variance between the difference between non-matching patches, when projected, and the difference between matching patches, when projected. Once obtained, the matrix can be used to derive a descriptor of an image patch that facilitates determination of matching, and non-matching, patches. An image patch whose descriptor is to be obtained can initially be transformed, in an analogous manner to the initial transformation applied to the training patches. Subsequently, a linear discriminant embedding process can use the generated matrix to linearly project the transformed patch onto a subspace comprising fewer dimensions. A normalized version of this projection can act as the descriptor of the image patch.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100, for obtaining a linear discriminant embedding matrix 130, is illustrated. Initially, in one embodiment, multiple training image patches 110 can be provided to an image patch matcher 115. The training image patches 110 can be representative of the types of image patches for which the linear discriminant embedding matrix 130 will be used to derive the descriptors thereof. Thus, for example, if the linear discriminant embedding matrix 130 will be used in the context of facial recognition, the training image patches 110 can be patches obtained from sample images of faces. Similarly, if, for example, the linear discriminant embedding matrix 130 will be used to derive descriptors of patches that are 64-by-64 pixels, then the training image patches 110 can be similarly sized.

The image patch matcher 115 can, in one embodiment, identify matching patches from among the training image patches 110 based on additional knowledge that may not be available except in the context of training data, such as the training image patches 110. For example, the image patch matcher 115 can identify matching image patches based on robust three-dimensional correspondence data associated with the training image patches 110. The selected matching training image patches can be identified with an appropriate label appended to the training image patch data. In one embodiment, non-matching patches can simply be assumed from the lack of a label indicating otherwise. Alternatively, non-matching patches can be explicitly indicated in a manner analogous to the labeling of matching patches.

In an alternative embodiment, the image patch matcher 115 can simply accept a set of registered training images. In a further alternative embodiment, the image patch matcher 115 can use descriptors obtained by using a previously derived linear discriminant embedding matrix 130 in the manner illustrated by the exemplary system 150 and described further below. In such a case, by using a previous linear discriminant embedding matrix 130 as part of the derivation of a new linear discriminant embedding matrix 130, the image patch matcher 115 can, thereby, provide a measure of feedback that enables further tuning of the linear discriminant embedding matrix 130.

Once the image patch matcher 115 has output the training image patches 110 with labels, or other indicators, of matching and, optionally, non-matching patches, one or more non-linear transformations can be applied to the vectors representing the training image patches 110 by the non-linear transformer 120. The non-linear transformation applied can be selected by the non-linear transformer 120 to emphasize those elements of the training image patches 110 that are shared among matching patches and those elements that distinguish non-matching patches. In one embodiment, the non-linear transformations applied by the non-linear transformer 120 can be based on normalized gradients of each of the training image patches. In particular, an image patch can be bias-gain normalized by subtracting the mean value of the pixels of the patch from each pixel and then dividing by the standard deviation of the pixel values of the image patch. Once an image patch is normalized, a normalized gradient along either the horizontal or vertical directions can be computed for any point in the patch.

One non-linear transformation that can be applied to the training image patches 110 by the non-linear transformer 120 is a linear interpolation of the magnitude of a normalized gradient, described above, determined at each point in the image patch. The normalized gradient magnitude can be interpolated into four orientation bins and the interpolations can be performed in the orientation of the gradient $\theta$, in a manner known to those skilled in the art. Another non-linear transformation that can be applied by the non-linear transformer 120 is to transform the normalized gradient, as described above, into a positive valued 4 vector whose elements can be the positive and negative components of the normalized gradient extending from the evaluation point up and down and to the left and right.

Other non-linear transformation that can be applied by the non-linear transformer 120 need not be based on normalized patches. For example, one such non-linear transformation can compute second order steerable filter responses at each location using four orientations. For each orientation, then, a 4 vector can be computed containing the rectified components of the quadrature pair. Another non-linear transformation can be the computation of istropic differences of Gaussian responses at each location for two different scales. The results can then be rectified to give 2×2 components for each location.

Once the training image patches have been transformed by the non-linear transformer 120, they can be used as input to the linear projection identifier 125 to determine a linear discriminant embedding matrix 130. The linear projection identifier 125 can find "discriminative projections," or projections that emphasize the common elements between matching patches and the disparate elements between non-matching patches, in the space of lifted training image patches. In particular, the linear projection identifier 125 can find those projections that maximize the ratio between the differences among non-matching patches to the differences among matching patches.

Each of the training image patches can be represented by a vector "p," comprising the values of the pixels of the image patch. A label, represented by the variable "$l_{ij}$," can be set to a value of one if the training image patches $p_i$ and $p_j$ were matching patches and can be set to a value of zero otherwise. Once the training image patches are transformed by the non-linear transformer 120, they can be represented by a different vector, such as x, where $x_i$=transform($p_i$). The operation of the linear projection identifier 125 then becomes to find a direction, represented by the vector "w", such that the ratio $$\frac{\sum_{l_{ij}=0}(w^T(x_i-x_j))^2}{\sum_{l_{ij}=1}(w^T(x_i-x_j))^2}$$

is maximized. The ratio can be written in terms of covariance matrices as $$\frac{w^T A w}{w^T B w}$$

where $$A = \sum_{l_{ij}=0}(x_i-x_j)(x_i-x_j)^T \text{ and } B = \sum_{l_{ij}=1}(x_i-x_j)(x_i-x_j)^T.$$

The vector w which maximizes the ratio $$\frac{w^T A w}{w^T B w}$$

can be shown to be the largest eigenvector of the generalized eigensystem Aw=λBw. Thus, the linear projection identifier 125 can identify a number of eigenvectors associated with the largest generalized eigenvalues represented by λ in generalized eigensystem Aw=λBw. In particular, the number of eigenvectors identified can correspond to the dimensionality of the resulting projection, which can be selected such that it is sufficient to provide for discrimination between image patches, while reducing computational and storage burdens.

In one embodiment, between 14 and 40 eigenvectors were found to be optimal for generating the linear discriminant embedding matrix 130.

In an alternative embodiment, as suggested by generalized eigensystem Aw=λBw, the goal of finding a vector w which maximizes the ratio $$\frac{\sum_{l_{ij}=0}(w^T(x_i-x_j))^2}{\sum_{l_{ij}=1}(w^T(x_i-x_j))^2}$$

can be proximately achieved by finding a vector w which maximizes the ratio $$\frac{\sum_{l_{ij}=0}(w^T x_i)^2}{\sum_{l_{ij}=1}(w^T(x_i-x_j))^2}.$$

Such a ratio can be equivalent to replacing the covariance matrix A representing non-matching pairs, as described above, with a weighted data variance for matching pairs expressed in the form $X^T D X$, where X can be a matrix composed of the set of all input vectors, namely $X=[x_1, x_2, \ldots, x_n]$, and D can be a diagonal matrix of entries indicating the number of image patches that match an image patch corresponding to the entry, namely D=diag($k_i$) where $$k_i = \sum_j l_{ij}.$$

Consequently, the vector w which maximizes the ratio $$\frac{\sum_{l_{ij}=1}(w^T x_i)^2}{\sum_{l_{ij}=1}(w^T(x_i-x_j))^2}$$

can be the largest eigenvector of the eigensystem $X^T D X w=\lambda B w$. The linear projection identifier 125 can, therefore, identify a number of eigenvectors, corresponding to the dimensionality of the resulting projection, that are associated with the largest eigenvalues λ. As above, between 14 and 40 eigenvectors were found to be optimal for generating the linear discriminant embedding matrix 130.

In a further alternative embodiment, the linear discriminant embedding matrix 130 can be composed of vectors orthogonal to one another. Thus, rather than merely seeking vectors w which maximize the ratio $$\frac{w^T A w}{w^T B w},$$

such as in the embodiments described above, the linear projection identifier 125 can determine those vectors w which both maximize the ratio $$\frac{w^T A w}{w^T B w}$$

and which are orthogonal to one another. For example, the $k^{th}$ vector $w_k$ can be a vector w which maximizes the ratio $$\frac{w^T A w}{w^T B w}$$

such that $w^T w_1=0$, $w^T w_2=0$, and so forth through $w^T w_{k-1}=0$, where vectors $w_1$ through $w_{k-1}$ are vectors previously obtained through analogous mechanisms. A solution can be found by solving another eigenvalue problem. In particular, an optimal solution for the vector $w_k$ can be the eigenvector associated with the largest eigenvalue $\lambda$ of a matrix $\hat{M}$ defined by the eigensystem $\hat{M}w=((I-B^{-1}W_k Q_k^{-1} W_k^T)B^{-1}A)w=\lambda w$, where the matrix W is composed of the orthogonal vectors $w_1$ though $w_{k-1}$, namely $W=[w_1, w_2, \ldots, w_{k-1}]$, and where the matrix $Q_k=W_k^T B^{-1} W_k$.

The constraint requiring orthogonality between the vectors w can be applied by the linear projection identifier 125 when determining the vector w according to either of the two embodiments previously described. For example, the matrix A in the eigensystem $\hat{M}w=((I-B^{-1}W_k Q_k^{-1} W_k^T)B^{-1}A)W=\lambda w$, which is used to identify orthogonal vectors w, can be of the form $$\sum_{l_{ij}=0} (x_i - x_j)(x_i - x_j)^T$$

as described in the former embodiment above. Alternatively, the matrix A in the eigensystem $\hat{M}w=((I-B^{-1}W_k Q_k^{-1} W_k^T)B^{-1}A)W=\lambda w$ can be of the form $X^T D X$, where $X=[x_1, x_2, \ldots, x_n]$, and $D=diag(k_i)$ where $$k_i = \sum_j l_{ij}$$

as described in the latter embodiment above.

In certain systems, an orthogonal linear discriminant embedding matrix 130 can provide useful benefits. For example, the lack of linear dependence can avoid redundancy with respect to the elements of the original image patches that are represented in the descriptor of the image patch 160 derived using the orthogonal linear discriminant embedding matrix 130. In addition, the constraints applied by the linear projection identifier 125 to generate an orthogonal linear discriminant embedding matrix 130 can be beneficial in reducing "overfitting," as described in more detail below.

In obtaining the linear discriminant embedding matrix 130, the linear projection identifier 125 obtains vectors w which maximize the ratio $$\frac{\sum_{l_{ij}=0} (w^T(x_i - x_j))^2}{\sum_{l_{ij}=1} (w^T(x_i - x_j))^2}$$

or the ratio $$\frac{\sum_{l_{ij}=1} (w^T x_i)^2}{\sum_{l_{ij}=1} (w^T(x_i - x_j))^2}.$$

In each embodiment, the denominator is based on the difference between two vectors, $x_i$ and $x_j$, derived from matching image patches $p_i$ and $p_j$. As the differences between two matching patches are decreased, such as through the transformation functions applied, the decreasing denominator can have a disproportionate effect on the maximization of the above ratios. Such a disproportionate effect can result in the identification of vectors w that, while maximizing the above ratios, are essentially projections in the noise components of the signals and would not have been identified as maximizing vectors if a greater number of training image patches 110 were used. Put differently, the maximization of the above ratios can be susceptible to "overfitting" to the training image patches 110 used.

While applying orthogonality constraints to the identification of vectors w that can be used to form the linear discriminant embedding matrix 130 can avoid some overfitting, in another embodiment, to minimize potential overfitting, the denominator term that is shared by both of the above described ratios, can be limited to a minimum threshold. As indicated previously, the denominator term $$\sum_{l_{ij}=1} (w^T(x_i - x_j))^2$$

can be expressed in the form $w^T B w$, where $$B = \sum_{l_{ij}=1} (x_i - x_j)(x_i - x_j)^T.$$

Using modal matrices, B can also be expressed as $U\Lambda U^T$, where $\Lambda$ can be a diagonal matrix whose values correspond to the eigenvalues $\lambda$ of the generalized eigensystem $Aw=\lambda Bw$. To limit the denominator term, a "regularized" version of the matrix B, denoted herein as B', can be used, where, if $B=U\Lambda U^T$, then $B'=U\Lambda' U^T$ such that the eigenvalues $\lambda'$ of the matrix $\Lambda'$ are the greater of either the corresponding eigenvalues $\lambda$ of the matrix $\Lambda$ or the eigenvalues representing a fraction of the corresponding signal power. More specifically, eigenvalues $\lambda'$ of the matrix $\Lambda'$ can be defined as $\lambda_i'=\max(\lambda_i, \lambda_r)$, where r is the minimum r' such that the ratio $$\frac{\sum_{i=r'}^{n} \lambda_i}{\sum_{i=1}^{n} \lambda_i}$$

is greater than or equal to a predetermined value less than 1, thereby defining a threshold on the signal to noise power ratio. In one embodiment, the ratio $$\frac{\sum_{i=r'}^{n} \lambda_i}{\sum_{i=1}^{n} \lambda_i}$$

is greater than or equal to approximately 20%.

Once the linear projection identifier 125, via one or more of the above described mechanisms, has identified a series of vectors w that can be combined to form the linear discriminant embedding matrix 130, the system 100 can complete its operation and the output linear discriminant embedding matrix 130 can then be used as part of system 150, which can identify a descriptor 180 of an image patch 160. Before describing the operation of system 150, the flow of the operations of system 100, described above, will be described with reference to flow diagram 200 of FIG. 2.

Initially, as shown by system 100 of FIG. 1, training image patches 110 can be received at step 210. Subsequently, the image patch matcher 115 can identify matching and non-matching image patches at step 220. As indicated above, such an identification can be performed via a variety of mechanisms, and the resulting identification can be appended to the image patch data or provided via other metadata. The vectors representing the image patches 110 can then be transformed at step 230 by the non-linear transformer 120, using a combination of one or more of the non-linear transformations described in detail above.

Figure 2:
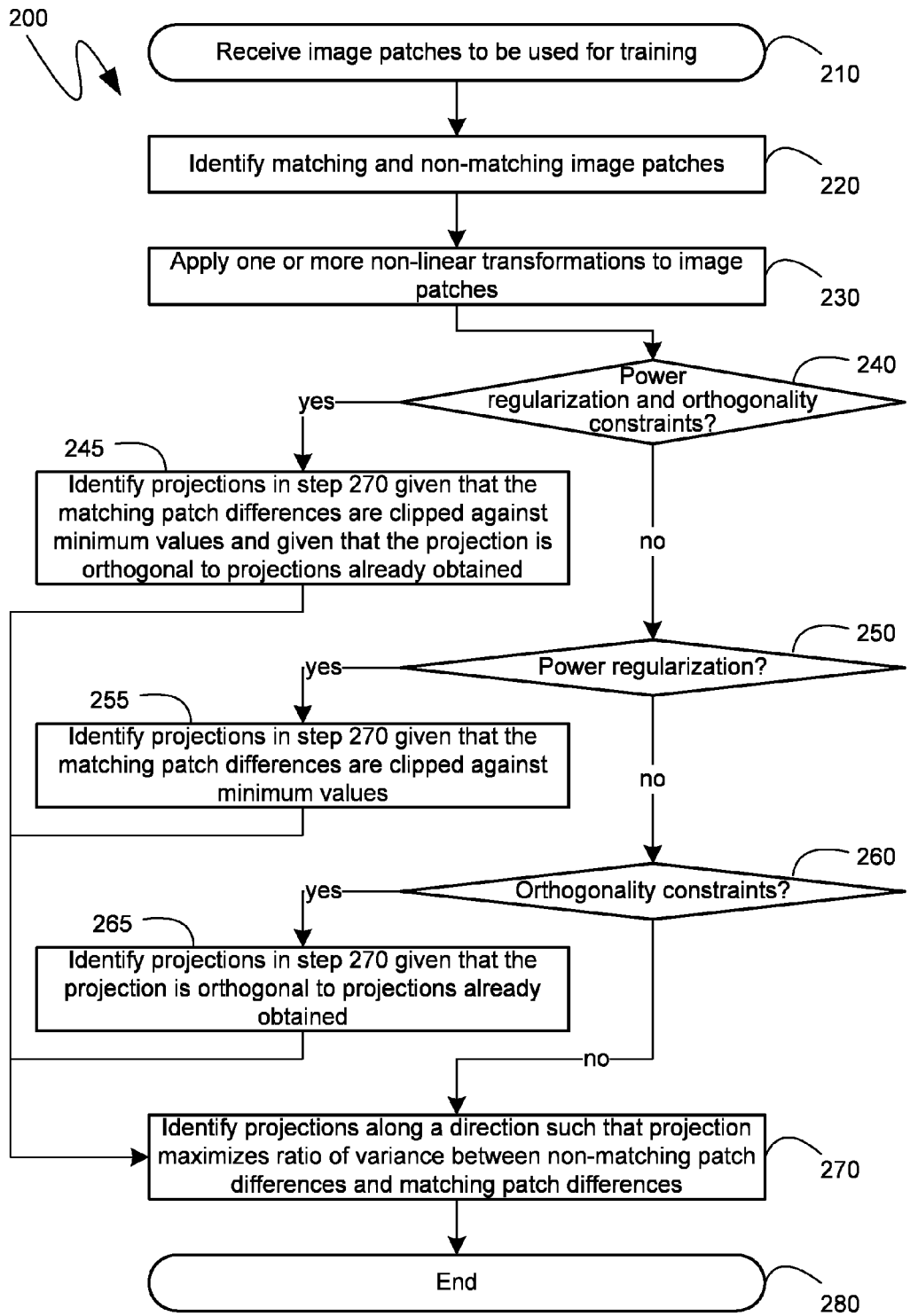
FIG. 2 is a flowchart illustrating an exemplary process for identifying a linear discriminant projection.

Subsequent to step 230, the transformed image patch data can be provided to the linear projection identifier 125 to be used to identify a linear discriminant embedding matrix 130, such as by the embodiments described in detail above. The decisions 240, 250 and 260 of FIG. 2 illustrate an exemplary mechanism by which the linear projection identifier 125 can determine which of the above described embodiments to use to generate the linear discriminant embedding matrix 130. The separation of the choices regarding the use of orthogonality constraints or regularization into three distinct decisions 240, 250 and 260 is for illustration and descriptive purposes only, as such a decision can be made through a single logical step. Thus, for illustration, at step 240, the linear projection identifier 125 can determine, either based on predefined criteria or settings, or based on user input, whether to apply both power regularization and othogonality constraints to its determination of a linear discriminant embedding matrix 130. If power regularization and orthogonality constraints are to be applied, then the linear projection identifier 125 can adjust the relevant settings at step 245 such that the projections, namely vectors w, identified by the linear projection identifier 125 at step 270 are in accordance with the orthogonality constraints defined above, and by using the regularized matrix B', as also described above.

If the decision at step 240 is to not apply both the power regularization and orthogonality constraints, steps 250 and 260 illustrate the decision to apply either without applying both. Again, the decisions 240, 250 and 260, and their associated steps 245, 255 and 265 are illustrated as distinct steps for purposes of illustration. Thus, decision 250 determines if power regularization is to be applied to the determination of the linear discriminant embedding matrix 130, while, if decision 250 determines not to apply power regularization, then decision 260 can determine if orthogonality constraints are to be applied to the determination of the linear discriminant embedding matrix 130. If decision 250 does determine to apply power regularization, then step 255 can adjust the relevant settings such that the projections identified at step 270 are achieved by using the regularized matrix B' described above. Similarly, if decision 260 does determine to apply orthogonality constraints, then step 265 can adjust the relevant settings such that the vectors w identified at step 270 are orthogonal to one other, as described above.

The determination of projections at step 270 can, in the manner described above, seek to find vectors w that, in one embodiment, maximize the ratio $$\frac{\sum_{l_{ij}=0}(w^T(x_i - x_j))^2}{\sum_{l_{ij}=1}(w^T(x_i - x_j))^2},$$

where $x_i$ and $x_j$ are transformed training image patches $p_i$ and $p_j$. Alternatively, the step 270 can, as also described above, seek to find vectors w that maximize the ratio $$\frac{\sum_{l_{ij}=1}(w^T x_i)^2}{\sum_{l_{ij}=1}(w^T(x_i - x_j))^2}.$$

Once such vectors have been identified, subject to any constraints that may have been applied by steps 245, 255 or 265, the process can end at step 280.

Returning back to FIG. 1, the system 150, shown in FIG. 1, illustrates one exemplary system that can utilize the linear discriminate embedding matrix 130. The system 150 can be used in a myriad of ways, including various forms of image recognition or facial recognition, as indicated above. To perform image recognition, as will be known by those skilled in the art, various portions of images can be compared to determine if they match. Rather than comparing such portions of images, or image patches, directly, the system 150 can be used to distill the image patch 160 into a descriptor 180 that can be of a significantly smaller dimensionality, enabling more efficient storage and processing.

Initially, as illustrated by the system 150, an image patch 160 can be provided to a non-linear transformer 165, which can apply transformations that seek to emphasize those elements of the image patch 160 that are common to matching image patches and those elements which distinguish image patch 160 from non-matching image patches. The non-linear transformer 165 can be analogous to the non-linear transformer 120, described above, and can apply analogous transformations, also described above. Thus, for example, the transformations applied by the non-linear transformer 165 can be based on normalized gradients of the image patch 160 obtained in part by subtracting the mean value of the pixels of the patch 160 from each pixel and then dividing by the standard deviation of the pixel values of the image patch. One non-linear transformation can be a linear interpolation of the magnitude of the normalized gradient determined at each point in the image patch 160. Another transformation that can be applied by the non-linear transformer 165 can be based on the transformation of the normalized gradient into a positive valued 4 vector whose elements can be the positive and negative components of the normalized gradient extending from the evaluation point up and down and to the left and right. Other non-linear transformations, such as those based on the second order steerable filter responses at each location using four orientations or those based on the computation of isotropic differences of Gaussian responses at each location for two different scales, as described in detail above, can likewise be performed by the non-linear transformer 165.

Once transformed, the image patch 160 can be provided to the linear discriminant embedding 170, which can linearly project the transformed image patch data into a subspace having fewer dimensions by using the linear discriminant embedding matrix 130. As described above, the data of the image patch 160 can be represented by a vector p of a dimensionality proportional to the size of the image patch. The transformed image patch can be represented by a vector x, such that x=transform(p). The linear discriminant embedding 170 can utilize the linear discriminant embedding matrix 130, represented now by the matrix U, to project the vector x into a subspace having fewer dimensions. The projected vector x' can, therefore, be $U^T x$.

Empirical results indicate that improved results can be achieved if the projected vector x' is normalized. Consequently, after the projection to the discriminant subspace by the linear discriminant embedding 170, the resulting projected vector x' can be normalized by the normalizer 175. The resulting vector, x̂, can be $$\frac{x'}{|x'|},$$

and can be the descriptor 180 that can then be used to determine if the image patch 160 matches some other image patch by comparing the descriptor 180 to the descriptor, as also determined by system 150, of such other patch.

Figure 3:
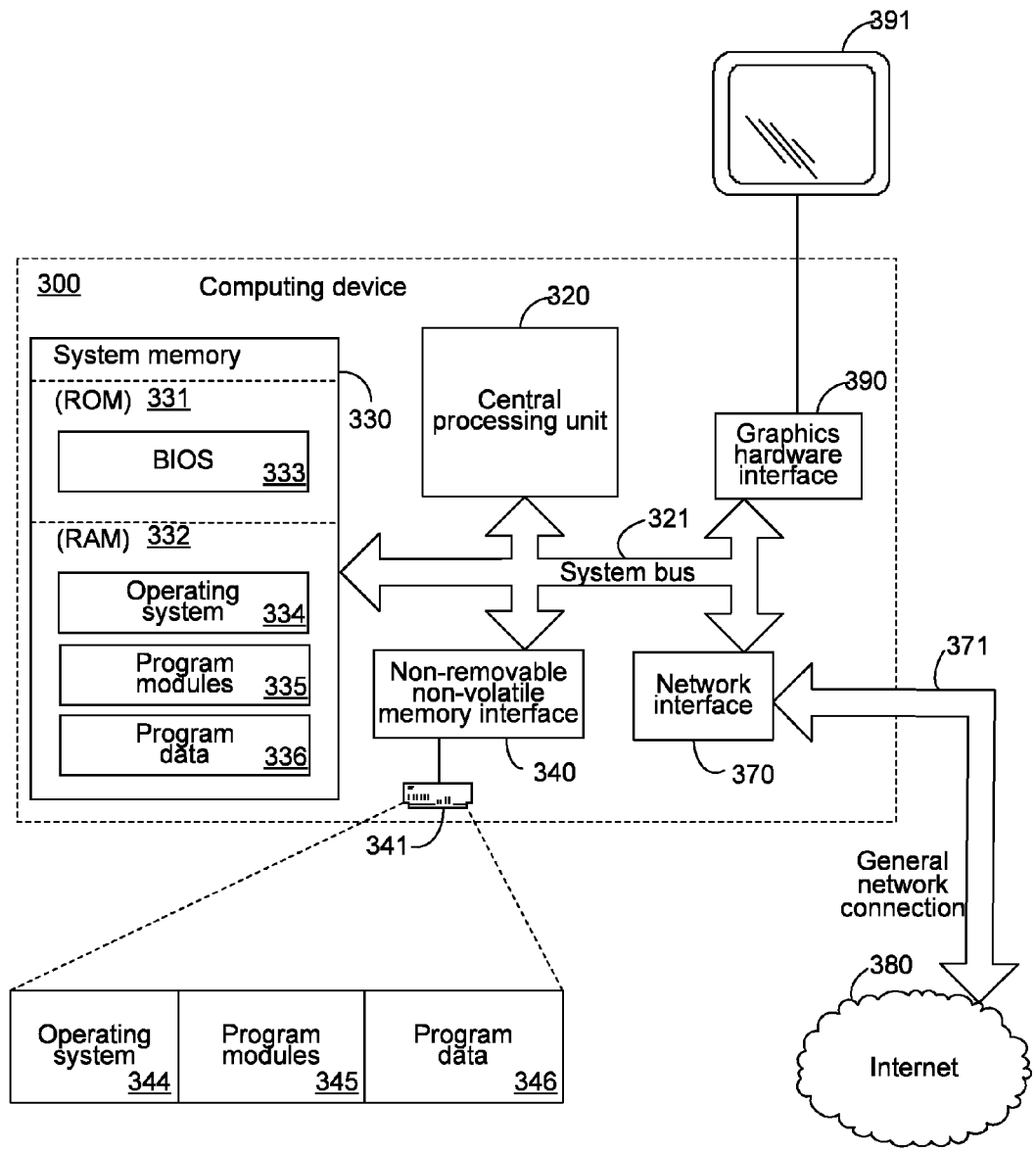
FIG. 3 is a block diagram of an exemplary computing device.

In one embodiment, the systems 100 and 150 can be comprised of one or more computing devices that can perform the functions described above. Turning to FIG. 3, one such computing device is illustrated in the form of exemplary computing device 300. The exemplary computing device 300 can include, but is not limited to, one or more central processing units (CPUs) 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include the Peripheral Component Interconnect (PCI) bus and various higher speed versions thereof, the Industry Standard Architecture (ISA) bus and Enhanced ISA (EISA) bus, the Micro Channel Architecture (MCA) bus, and the Video Electronics Standards Associate (VESA) bus. The computing device 300 can optionally include graphics hardware, including, but not limited to, a graphics hardware interface 390 and a display device 391.

The computing device 300 also typically includes computer readable media, which can include any available media that can be accessed by computing device 300 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computing device 300, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, other program modules 335, and program data 336.

The computing device 300 may also include other removable/non-removable, volatile/nonvolatile computer storage media. By way of example only, FIG. 3 illustrates a hard disk drive 341 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340.

The drives and their associated computer storage media discussed above and illustrated in FIG. 3, provide storage of computer readable instructions, data structures, program modules and other data for the computing device 300. In FIG. 3, for example, hard disk drive 341 is illustrated as storing operating system 344, other program modules 345, and program data 346. Note that these components can either be the same as or different from operating system 334, other program modules 335 and program data 336. Operating system 344, other program modules 345 and program data 346 are given different numbers hereto illustrate that, at a minimum, they are different copies.

The computing device 300 may operate in a networked environment using logical connections to one or more remote computers. For simplicity of illustration, the computing device 300 is shown in FIG. 3 to be connected to a network 380. However, the computing device 300 is not limited to any particular network or networking protocols. The logical connection depicted in FIG. 3 is a general network connection 371 that can be a local area network (LAN), a wide area network (WAN) or other networks. The computing device 300 is connected to the general network connection 371 through a network interface or adapter 370 which is, in turn, connected to the system bus 321. In a networked environment, program modules depicted relative to the computing device 300, or portions or peripherals thereof, may be stored in the memory of one or more other computing devices that are communicatively coupled to the computing device 300 through the general network connection 371. It will be appreciated that the network connections shown are exemplary and other means of establishing a communications link between computing devices may be used.

As can be seen from the above descriptions, mechanisms for determining a linear discriminant embedding matrix in an optimal fashion have been presented, as have mechanisms for subsequently using such a matrix to perform a linear discriminant embedding, and thereby obtain a descriptor of an image patch for purposes of matching image patches. In view of the many possible variations of the subject matter described herein, we claim as our invention all such embodiments as may come within the scope of the following claims and equivalents thereto.

We claim:

1. One or more computer-readable storage media comprising computer-executable instructions for deriving a linear discriminant embedding matrix, the computer-executable instructions directed to steps comprising:
   receiving multiple training image patches comprising an indication of matching training image patches;
   applying one or more non-linear transformations to vectors representing the multiple training image patches to obtain multiple transformed training image patches;
   identifying multiple projections of the transformed training image patches that maximize a ratio of variance between differences between pairs of transformed training image patches that are not matching and differences between pairs of transformed training image patches that are matching; and
   forming the linear discriminant embedding matrix from the identified multiple projections.

2. The computer-readable storage media of claim 1 comprising further computer-executable instructions directed to determining which training image patches are matching and appending to the matching training image patches the indication of matching training image patches.

3. The computer-readable storage media of claim 1, wherein the identifying the multiple projections is constrained by requiring that the identified multiple projections are orthogonal to each other.

4. The computer-readable storage media of claim 1, wherein the identifying the multiple projections is constrained by requiring that the differences between pairs of transformed training image patches that are matching be limited to a fraction of a corresponding signal power.

5. The computer-readable storage media of claim 1, wherein the identifying the multiple projections comprises identifying less than 40 multiple projections.

6. The computer-readable storage media of claim 1, wherein the multiple training image patches are between 10,000 and 100,000 training image patches.

7. The computer-readable storage media of claim 1, wherein the one or more non-linear transformations are based on normalized gradients obtained from normalized multiple training image patches.

8. One or more computer-readable storage media comprising computer-executable instructions for deriving a descriptor of an image patch, the computer-executable instructions directed to steps comprising
   receiving an image patch;
   applying one or more non-linear transformations to vectors representing the image patch to obtain a transformed image patch; and
   linearly projecting the transformed image patch into a discriminant subspace using a linear discriminant embedding matrix formed from multiple projections that maximized a ratio of variance between differences between pairs of transformed training image patches that are not matching and differences between pairs of transformed training image patches that are matching.

9. The computer-readable storage media of claim 8 comprising further computer-executable instructions directed to normalizing the linearly projected transformed image patch to form the descriptor of the image patch.

10. The computer-readable storage media of claim 8, wherein the discriminant subspace has a dimensionality equivalent to the quantity of the multiple projections, the dimensionality being less than 40.

11. The computer-readable storage media of claim 8, wherein vectors comprising the linear discriminant embedding matrix are orthogonal to each other.

12. The computer-readable storage media of claim 8, wherein the differences between pairs of transformed training image patches that are matching are limited to a fraction of a corresponding signal power.

13. The computer-readable storage media of claim 8, wherein the one or more non-linear transformations are based on normalized gradients obtained from a normalized version of the image patch.

14. A computer-implemented method of generating a computer-readable linear discriminant embedding matrix comprising the steps of:
   applying, by a non-linear transformer, one or more non-linear transformations to vectors representing multiple training image patches, that comprise an indication of matching training image patches, to generate multiple transformed training image patches;
   identifying, by a linear projection identifier, multiple projections of the transformed training image patches that maximize a ratio of variance between differences between pairs of transformed training image patches that are not matching and differences between pairs of transformed training image patches that are matching; and
   generating, by the linear projection identifier, the computer-readable linear discriminant embedding matrix from the identified multiple projections.

15. The computer-implemented method of claim 14 further comprising the steps of: determining, by an image patch matcher, which training image patches are matching; and appending, by the image patch matcher, to the matching training image patches, the indication of matching training image patches.

16. The computer-implemented method of claim 14, wherein the identifying the multiple projections is constrained by requiring that the identified multiple projections are orthogonal to each other.

17. The computer-implemented method of claim 14, wherein the identifying the multiple projections is constrained by requiring that the differences between pairs of transformed training image patches that are matching be limited to a fraction of a corresponding signal power.

18. The computer-implemented method of claim 14, wherein the identifying the multiple projections comprises identifying less than 40 multiple projections.

19. The computer-implemented method of claim 14, wherein the multiple training image patches are between 10,000 and 100,000 training image patches.

20. The computer-implemented method of claim 14, wherein the one or more non-linear transformations are based on normalized gradients obtained from normalized multiple training image patches.

* * * * *